US010584447B2

(12) United States Patent
Fenile et al.

(10) Patent No.: US 10,584,447 B2
(45) Date of Patent: Mar. 10, 2020

(54) RUNNING RAIL AND METHOD FOR PRODUCING SUCH A RUNNING RAIL

(71) Applicant: FERAG AG, Hinwil (CH)

(72) Inventors: Roberto Fenile, Wetzikon (CH); Erich Kaelin, Rapperswil (CH)

(73) Assignee: FERAG AG, Hinwil (CH)

( * ) Notice: Subject to any disclaimer, the term of this patent is extended or adjusted under 35 U.S.C. 154(b) by 347 days.

(21) Appl. No.: 15/506,011

(22) PCT Filed: Aug. 20, 2015

(86) PCT No.: PCT/EP2015/069156
§ 371 (c)(1),
(2) Date: Feb. 23, 2017

(87) PCT Pub. No.: WO2016/030274
PCT Pub. Date: Mar. 3, 2016

(65) Prior Publication Data
US 2017/0275826 A1     Sep. 28, 2017

(30) Foreign Application Priority Data

Aug. 27, 2014  (CH) ...................................... 1289/14

(51) Int. Cl.
*E01B 25/24*   (2006.01)
*B61B 13/04*   (2006.01)
(Continued)

(52) U.S. Cl.
CPC .............. *E01B 25/24* (2013.01); *B61B 13/04* (2013.01); *B65G 9/008* (2013.01); *B65G 19/025* (2013.01);
(Continued)

(58) Field of Classification Search
CPC .......... E01B 25/00; E01B 25/08; E01B 25/10; E01B 25/22; E01B 25/24; B61B 3/00; B61B 3/02
See application file for complete search history.

(56) References Cited

U.S. PATENT DOCUMENTS 3,012,519 A   12/1961  Bingham
3,338,179 A    8/1967  Klemm
(Continued)

FOREIGN PATENT DOCUMENTS

CH           680922 A5    12/1992
CN         101844149 A     9/2010
(Continued)

OTHER PUBLICATIONS

Co-pending U.S. Appl. No. 15/506,056, "Carriage for a Conveyor, in Particular for a Gravity Conveyor, Conveying System, and Method for Operating a Conveying System," filed Feb. 23, 2017.
(Continued)

*Primary Examiner* — Robert J McCarry, Jr.
(74) *Attorney, Agent, or Firm* — Pauley Erickson & Kottis (57) ABSTRACT

A running rail (1) for a conveyor system, the running rail (1) having a cross-sectional profile comprising, at least three interconnected profiled portions which comprise a first profiled portion (2), laterally open to the outside, for receiving first rollers (32) of a carriage (30), a second profiled portion (3), laterally open to the outside, for receiving second rollers (33) of a carriage (30), a third profiled portion (4), open in the vertical direction, for receiving third rollers (34) of a carriage (1), wherein the first (2) and the second profiled portion (3) are mirror symmetrical to a vertical central plane (40) of the running rail (1).

19 Claims, 4 Drawing Sheets

(51) Int. Cl.
   *B65G 9/00*    (2006.01)
   *B65G 19/02*   (2006.01)
   *B65G 39/18*   (2006.01)
   *E04C 3/04*    (2006.01)
   *B23K 9/00*    (2006.01)

(52) U.S. Cl.
   CPC ............... B65G 39/18 (2013.01); *B23K 9/00* (2013.01); *B65H 2405/55* (2013.01); *E04C 2003/0413* (2013.01); *E04C 2003/0421* (2013.01); *E04C 2003/0439* (2013.01)

(56) References Cited

U.S. PATENT DOCUMENTS

| | | | |
|---|---|---|---|
| 3,715,991 A | 2/1973 | Boyd | |
| 4,248,157 A | 2/1981 | Evans | |
| 4,531,460 A | 6/1985 | Pamer | |
| 4,973,219 A | 11/1990 | Brickner et al. | |

FOREIGN PATENT DOCUMENTS

| | | | |
|---|---|---|---|
| CN | 201 777 248 U | 3/2011 | |
| CN | 103210146 A | 7/2013 | |
| DE | 33 47 842 A1 | 4/1985 | |
| DE | 39 10 542 C1 | 8/1990 | |
| DE | 3910542 | * 8/1990 | ............ E01B 25/24 |
| DE | 9204955 | * 4/1992 | ............ E01B 25/24 |
| DE | 92 04 955 U1 | 6/1992 | |
| DE | 10 2006 056 943 A1 | 6/2008 | |
| DE | 10 2006 058 422 A1 | 6/2008 | |
| EP | 0 291 622 A2 | 11/1988 | |
| EP | 0 713 834 A2 | 5/1996 | |
| EP | 0 856 480 A1 | 8/1998 | |
| EP | 1 682 322 A1 | 8/2006 | |
| FR | 2212466 A1 | 7/1974 | |
| FR | 23 231 256 A5 | 12/1974 | |
| JP | S60 132971 U | 9/1985 | |
| JP | H03 95021 A | 4/1991 | |
| JP | H03 91405 U | 9/1991 | |
| JP | H04 342657 A | 11/1992 | |
| WO | WO 2013/135918 | 9/2013 | |
| WO | WO 2014/153675 A1 | 10/2014 | |

OTHER PUBLICATIONS

Chinese Patent Office, First Office Action, Chinese Patent Application No. 201580045601.7, dated Jul. 30, 2018 (23 pages).
http://www.ferag.com/en/1033/Buffering.htm, "Buffering," Screenshot, System for Buffering Goods, © 2017, Ferag AG, Hinwil, Switzerland (3 pages).

* cited by examiner

RUNNING RAIL AND METHOD FOR PRODUCING SUCH A RUNNING RAIL

BACKGROUND OF THE INVENTION

Field of the Invention

The present invention relates to the conveying of wares. Said present invention relates to a running rail for a conveyor, in particular for a gravity-type conveyor, and to a method for manufacturing such a running rail.

Discussion of Related Art

In the case of producing and post-processing of goods, as well as in the case of picking and packing orders, automated conveying of wares plays an important role. In particular, suspended conveyor systems herein are distinguished inter alia in that the former enable conveying of wares to be repositioned from the floor to otherwise non-utilized spatial regions within or outside of buildings. Suspended conveyor installations are therefore often fastened overhead on supports which are attached to the ceiling, to walls, or to individual pillars which are fastened to the floor.

Moreover, conveyor systems are used as a buffer between two or a plurality of work processes of dissimilar speeds. On account thereof, networked processes may be decoupled in terms of time and/or space, thus enabling disruptions in processes to be remedied without having to stop the remaining parts of a process chain, for example. Differences in the cycle times in processing may be likewise absorbed in this way.

In many sectors, gravity-type conveyors, in particular gravity-type suspended conveyors, are particularly suitable for building up buffers. This is based on the better utilization of space, as has already been mentioned, on the one hand. On the other hand, said suspended conveyors are relatively energy-saving, since the latter as opposed to actively conveyed suspended conveyor systems do not require any drive means such as drive chains, for example, which are routed along the entire length of the running rails, but often have only a few short actively conveyed sections. On account thereof, gravity-type suspended conveyors may also be decreased or increased in size in a targeted, relatively simple and cost-effective manner, so as to-be adapted with a view to changed production requirements.

It is important for the reliable function of many conveyor systems, in particular of gravity-type suspended conveyors, that the running rails used dispose of consistently positive running properties. In particular, it has to be ensured that transportation units are not inadvertently slowed down or even stopped on sections of the track where conveying is by gravity, since this would lead to delays or interruptions in conveying. To this end, the running rails used must enable the carriages moving on them to roll and/or to slide at low resistance.

Various types of running rails for conveyor installations are known in the prior art.

A conveying means including a conveyor truck having at least one first, second, and third castor, rail-conveyed along a rail track is described inter alia in the as yet unpublished international patent application PCT/CH2014/000032 of the present applicant, which was filed on 19 Mar. 2014. The rotation planes of the at least one first, second, and third castor herein are to be disposed at an angle of more than 0° and less than 180° in relation to one another. In order for a tilting torque in the conveying direction of the conveyor trucks which are moved in a mutually independent manner along a conveying path to be avoided, an arrangement having two or more first, second, and/or third castors is provided. A conveyor installation having such conveying means is likewise described. According to the patent application, such a conveyor installation may dispose of a rail track with a rail body which for the first, the second, and the third castors of the conveying means has at least one longitudinal rail body portion having at least three running faces that are disposed on the external circumference of the rail body. Herein, the surface normals of these running faces are to be disposed at an angle of more than 0° and less than 180°. To this end, the patent application shows hexagonal profiles of dissimilar specifications.

A system for buffering goods during production, which is associated with the mentioned international patent application, is shown by the present applicant on the Internet (http://www.ferag.com/en/1033/Buffering.htm). This system is suitable for a multiplicity of applications. However, in the case of certain applications it may be necessary for the carriages, the rail type, and the rail profile to be specially adapted to the conveyed goods in order for an optimum result to be obtained.

EP 0 856 480 A1 describes a rail-guided transportation means, in particular for conveying print products, and a transportation installation having transportation means of this type. The transportation means comprises a plurality of wheels which on two sides bear on a guide rail. Herein, movements that are transverse to the conveying direction are said to be prevented by means of a wheel flange which is attached to the wheels. A transportation means according to the description is to be mounted and guided on the guide rail in a largely clearance-free manner by way of wheels that are disposed in a mutually offset manner or by way of anti-friction means. The patent application shows running rails having a flat strip-like shape, as well as running rails having a T-shape.

U.S. Pat. No. 4,531,460 shows a material transportation system which is also suitable for transporting goods having a great weight in a suspended manner. Supports which comprise at least two mechanically connected support heads are described. Herein, one head may serve as a drive head, and the second head may serve as an idler head. The two support heads each have support wheels which run on horizontal running faces of a support rail. Additionally, the support heads have comparatively small guide rollers which rotate about vertically disposed axes and which are disposed above and below the support wheels. The support rails shown have guide belts which are disposed at the top and at the bottom and which may be contacted by the guide rollers. The support heads shown cannot transmit any torques about horizontal transverse axes to the support rails shown.

EP 0 291 622 B1 shows a rail for guiding a drive chain in a conveyor belt system for handling individual objects, by way of which the objects are movable on selectable paths. The rail is said to comprise a plurality of prefabricated modules which are releasably interconnected, wherein each module forms a portion having a square cross section. According to the publication it is provided that the modules are composed of straight and curved modules, wherein there is only one type of curved module, the curvature radius of the curved modules being determined by the smallest curve radius of the drive chain being used. A guide matching the respective drive chain is disposed on each module on each of the four sides thereof. In this way, ascending or descending paths and curves may be produced using the one type of curved module in that the latter is rotated and the drive chain is obviously disposed in the respective and vertically downwardly directed guide. As shown, the guides that are not occupied by the drive chain are said to serve for receiving connectors of a plurality of modules, for instance.

It has emerged that in the case of the previous systems in which the carriages along sections have to move forwards in a self-acting manner driven by gravity on running rails, obstructions to the running of the carriages arise above all where the running path comprises spatial curves. Such obstructions which also depend on the type of the transported goods may significantly compromise the operation of such a conveyor system.

SUMMARY OF THE INVENTION

It is therefore an object of the invention to provide a running rail having reliable running characteristics, in particular for a gravity-type conveyor installation. Such a running rail is to enable the transportation of goods having dissimilar masses and/or dimensions with reliable running on almost arbitrary running paths.

A further object of the invention is to provide an advantageous method for manufacturing such a running rail.

These and further objects are achieved by the claimed invention. Design embodiments of the invention are derived from the dependent claims.

The running rail according to the invention for a conveyor system, in particular for a gravity-type conveyor, in the cross-sectional profile comprises:

a) at least three interconnected profiled portions comprising b) a first profiled portion, laterally open to the outside, for receiving first rollers of a carriage, and c) a second profiled portion, laterally open to the outside, for receiving second rollers of a carriage, and d) a third profiled portion, open in the vertical direction, for receiving third rollers of a carriage.

Said running rail according to the invention is characterized in that e) the first and the second profiled portion are disposed in a mirror-symmetrical manner to a vertical central plane of the running rail.

The third profiled portion, open in the horizontal direction, in the vertical direction may be opened toward the top or the bottom.

In one design embodiment of the invention, said third profiled portion in the vertical direction may also be opened both toward the top as well as to the bottom. Herein, it is also possible in the context of the present invention for a running rail at least in portions to also be rotated about the longitudinal axis thereof, on account of which the alignment of the profiles is also modified, of course.

In one design embodiment of the invention, the first and the second rollers may be support rollers, and the third rollers may be guide rollers. These rollers may at times change these functions and/or mutually swap the latter, as will be explained in more detail at a later stage.

One design embodiment of the running rail according to the invention is distinguished in that the third profiled portion is configured and disposed so as to be mirror-symmetrical to the vertical central plane of the running rail.

Another design embodiment of the running rail according to the invention is characterized in that the first, the second, and the third profiled portion each have a cross-sectional profile in a U-shape, comprising a connection portion and legs contiguous thereto on both sides.

A further design embodiment of the running rail according to the invention is characterized in that the connection portion of the first profiled portion and the connection portion of the second profiled portion are disposed perpendicularly on the connection portion of the third profiled portion and abut the latter.

A further design embodiment of the running rail according to the invention is distinguished in that the first and the second profiled portion are mutually spaced apart and form an intermediate space which extends along the running rail.

A further design embodiment of the running rail is distinguished in that the intermediate space, extending along the running rail, at the top is closed by a mechanical connection between the first and the second profiled portion. Such a closed intermediate space, extending along the running rail, may also have individual openings. Running rails according to the invention, having such a closed intermediate space, are distinguished by particularly high torsional rigidity and also by high flexural rigidity.

It is also possible within the scope of the invention that an intermediate space, extending along the running rail, at least in portions is filled. In particular, a filling having a vibration-damping or noise-damping material, respectively, is possible. On account thereof, sounds such as those caused by the rollers of the carriages on the running rail may be damped, and/or the inherent frequencies or eigenmodes, respectively, of a running rail may be modelled in a targeted manner. Alternatively or additionally to the noise damping, the strength and the rigidity of a running rail according to the invention may also be increased by way of such a filling at least in portions.

Alternatively or additionally, noise-damping structures such as heavy foils, for example, may also be applied to those surfaces of the running rail that do not serve as running faces.

Alternatively or additionally, cables or hoses, for example, in particular such for compressed air, for controlling, monitoring, driving or similar, may also be disposed in an intermediate space extending along a running rail. An intermediate space extending along a running rail may also be used for connecting a plurality of running rails so as to form a running rail track, as will be explained in more detail at a later stage.

A further design embodiment of the running rail is distinguished in that means for fastening the rail to a support construction, a ceiling, or the like are provided on the running rail.

A further design embodiment of the running rail is distinguished in that the mentioned means for fastening the rail comprise fish plates which are attached to the upper side of the running rail. Such fishplates may be used for suspending the running rail from the ceiling of a building, for example.

In the case of a running rail that is rotated by 180° about an axis which is parallel with the running direction, these means for fastening may also be considered to be attached to the lower side of the running rail.

A further design embodiment of the running rail is distinguished in that the mentioned means for fastening the rail comprise openings which penetrate the running rail. Such openings may penetrate the running rail in the vertical or the horizontal direction, for example.

One design embodiment of the running rail according to the invention is characterized in that the running rail is integrally configured.

In particular, the running rail according to the invention may be integrally manufactured by an extrusion method.

In a further design embodiment of the running rail according to the invention said running rail is characterized in that the latter is manufactured by bending a metal band.

In yet again another design embodiment of the running rail according to the invention, said running rail is configured in multiple parts. In particular, manufacturing of the running rail according to the invention in multiple parts is possible in which case the first, the second, and the third profiled portion each comprise one U-rail, the latter being interconnected in a mechanically fixed, in particular in a materially integral manner.

A further design embodiment of the running rail according to the invention is characterized in that the running rail is made from a stainless steel or aluminium. In this context, both aluminium alloys as well as pure aluminium are understood to be aluminium within the scope of the invention.

A running rail according to the invention may meet the mechanical requirements set therefor by way of the use of stainless steel, on the one hand. On the other hand, such a running rail from stainless steel may also meet specific chemical requirements such as are set for devices used in the foodstuffs industry, for example.

One design embodiment of the running rail according to the invention is distinguished in that said running rail is manufactured from a stainless steel from the group including X6Cr17, X5CrNi18-10. These two alloys are readily cold-formable and at the same time also readily weldable. Moreover, both alloys are suitable for use in the foodstuffs industry.

However, a running rail according to the invention in principle may also be manufactured from other materials such as from plastics, from fibre-reinforced plastics, or from other metals such as titanium, for example.

A further design embodiment of the running rail according to the invention is distinguished in that means for connecting the running rail to further running rails, so as to form a continuous running rail track, are disposed in the region of the ends of the running rail.

In one design embodiment of the running rail according to the invention, the means for connecting comprise bores which are provided in the region of the ends of the running rails. These bores may serve for fastening connector parts which can be inserted into the ends of rails to be connected. In some embodiments, such bores may at the same time also be used as means for fastening a running rail to a building, as has already been described.

The method according to the invention for manufacturing a running rail by bending a metal band or a metal strip comprises the following steps:

a) providing a metal band or a metal strip comprising a first and a second longitudinal edge, the latter being parallel with the first longitudinal edge;

b) bending the metal band or the metal strip to the shape of a profile such that the first and the second longitudinal edge of the metal band or of the metal strip mutually abut;

c) closing the profiled body by welding the first to the second longitudinal edge of the metal band or of the metal strip.

One design embodiment of the method according to the invention is characterized in that the first and the second longitudinal edge of the metal band or of the metal strip in the case of the finished bent running rail mutually abut on the upper side or the lower side of the latter. It is possible herein for the two longitudinal sides to overlap at least in regions, as will be explained in more detail at a later stage.

In particular, the first and the second longitudinal edge of the metal band in the case of the finished bent running rail may mutually abut outside the vertical symmetry plane of the running rail, having a predetermined spacing in the bent state from the vertical symmetry plane (or central plane).

A further design embodiment of the method according to the invention is distinguished in that the metal band has a thickness between 0.5 mm and 2.5 mm. The metal band preferably has a thickness of 1.0 mm.

A running rail according to the invention, for a conveyor, is suitable to a particular degree for a carriage such as is described in detail in a parallel Swiss patent application of the present applicant that is simultaneously filed with the present Swiss patent application. In principle, however, a running rail according to the invention is not limited to being used with such carriages. In particular, such a running rail is also suitable for units of interlinked carriages.

It has been demonstrated in the past in the case of certain loads that rollers of carriages for gravity-type conveyors align themselves in relation to the running rail such that the rolling resistance of the latter is greatly increased. This may arise, for example, when rollers depart from the running faces per se of a running rail and instead contact faces having a significantly higher rolling resistance. It is also possible for the contact forces between the rollers and the running faces to be greatly increased in the case of certain loads, this likewise potentially resulting in a significant increase of the rolling resistance.

Likewise, a carriage by virtue of certain external forces under certain circumstances may be aligned in relation to a running rail such that jamming between the running rail and the carriage body and/or the rollers may arise, on account of which the carriage is decelerated. Conveying under certain circumstances is thus at least temporarily interrupted, and/or the carriage or the running rail may be damaged.

In the case of gravity-type conveyors, in particular gravity-type suspended conveyors, (translatory) forces in the running direction (x), forces horizontally lateral to the running direction (y), and forces in the vertical direction (z) act on a carriage, on the one hand. Besides, however, various torques which are caused in particular by incidents of acceleration of the conveyed goods, or else of the carriage per se, during transportation along the conveyor path also act on a carriage. Such incidents of acceleration mainly arise in the case of horizontal and vertical changes of direction, and in the case of braking procedures or of speed increases.

Above all, tilting torques, that is to say torques about axes (y) that are aligned so as to be lateral to the running direction, have proven problematic herein for many rail types known from the prior art. However, depending on the goods to be conveyed and on the profile of the rail path, yaw torques, that is to say torques about axes (z) that are vertical to the running direction, may likewise become problematic. The same applies to rolling torques, that is to say torques about axes (x) that are aligned so as to be parallel with the running direction.

In order to be able to guarantee reliable transportation, in particular reliable conveying of the carriages in terms of running, it is necessary for the mentioned static and dynamic stresses that arise in a carriage to be able to be transmitted in a controlled manner from the carriage to the running rail at any time.

To this end, a carriage and a running rail must be configured in a mutually matching manner.

Additionally, however, it is also necessary for a running rail to have sufficient mechanical strength and rigidity in order to be able to absorb the loads acting on the former without any structural failure or heavy deformations.

To this end, a running rail according to the invention comprises profiled portions which are suitable for receiving castors of a carriage, and a profiled portion which is suitable for receiving guide rollers of a carriage. For this purpose, the running rail is configured such that the latter may be embraced by a carriage that functions as an external runner.

The design of the running rail for external runners enables simple and reliable cleaning of the running rails, this being absolutely necessary in particular in the foodstuffs industry.

The profiled portion for receiving the guide rollers of a carriage, on the one hand, may serve for guiding the carriage such that the running direction of the latter is substantially congruent with that of the running rail. This is performed in that centripetal forces are exerted on the guide rollers by the profiled portion for receiving the guide rollers, for example in curved portions, on account of which the carriage is redirected. Moreover, in the case of carriages having a plurality of guide rollers, for example, the yaw movements such as the maximum possible rotation of a carriage about a vertical axis (z) in relation to the running rail are restricted by the assigned profiled portions. On account thereof, the running direction (or the alignment, respectively) of the cart cannot deviate from that of the running rail by more than a predetermined measure.

The support roller of a carriage is thus at the same time prevented from coming into contact with parts of the running rail that are not running faces. Yaw torques which act on the carriage may also be simultaneously absorbed by the running rail by guiding a carriage by means of guide rollers which are disposed in the respective profiled portion of the running rail.

The two profiled portions, present in the case of a running rail according to the invention, for receiving support rollers serve for receiving the weight of a conveyed cargo and that of a carriage, on the one hand. Additionally, however, these profiled portions may be used for limiting tilting movements of a carriage in relation to the running rail. Such tilting movements may arise, for example, in the case of descending (or ascending) running paths.

Such a restriction of tilting movements according to the invention may be achieved when a carriage disposes of two pairs of sequentially disposed support rollers, each being disposed in one profiled portion, for example.

Such a restriction may likewise be achieved by linking a plurality of carriages each having only one support roller per side.

In the case of such a carriage, tilting of a carriage in the case of a descending running path is permitted only until a forward support roller of one roller pair comes into contact with an upper running face of the running rail, and a rearward support roller is in contact with a lower running face. In this way, tilting torques may be transmitted from a carriage to a running rail according to the invention without the rolling resistance of the carriage significantly increasing. It is likewise prevented by such a restriction of tilting movements that the guide rollers come into contact with regions of the running rail that are not running faces.

Moreover, the support rollers that are received by the respective profiled portions of a running rail according to the invention are mounted within the profiled portions such that rolling torques of a carriage in relation to the running rail may also be transmitted to the latter. Such rolling torques may arise in curved portions, for example. In the case of pure rolling torques, a rolling movement which leads to the support rollers on a first side of a carriage coming into contact with the upper running faces of the first profiled portion of the running rail, and the support rollers on a second side of a carriage coining into contact with the lower running faces of the second profiled portion, or vice-versa, is generated. Such contacting defines a maximum rolling movement. On account thereof, a maximum rolling movement between a carriage and the running rail is defined, and it is prevented that the guide rollers come into contact with parts of the running rail that are not running faces.

Manufacturing of running rails according to the invention may be performed by an extrusion method, for example. Running rails which are manufactured in this manner may also be referred to as integrally formed. Running rails which are manufactured by an extrusion method are inter alia distinguished by high dimensional accuracy.

Alternatively or additionally, a running rail may also be manufactured from two or more individual profiles which are interconnected. For example, a running rail may be manufactured from three U-shaped profiles which are screwed, adhesively bonded, soldered/brazed, or welded together.

In the case of one preferred method for manufacturing a running rail according to the invention, such a running rail is manufactured from a metal band or a metal strip (or a sheet-metal band or a sheet-metal strip, respectively) by means of a bending method. Such a method may in particular comprise (cold) profile-forming. On account thereof, a dimensionally accurate and reproducible production of a running rail is possible.

Likewise, in particular cold profile-formed running rails generally have surfaces with lower roughness parameters than running rails manufactured by other methods. Thus, the effort for post-treating the running faces after cold profile-forming may be reduced, or such post-treatment may even be entirely unnecessary.

In the case of a manufacturing method by means of bending it may be advantageous for the longitudinal edges of the original metal band or metal strip upon completion of bending or profile-forming, respectively, to bear on one another and to be mutually parallel, or to at least in portions lie on top of one another, so that said longitudinal edges may subsequently be mechanically connected.

Such a connection may comprise a weld seam, for example. Such a weld seam may run continuously along a running rail, or may also be interrupted. A weld seam may also comprise spot welds.

For certain fields of application of a running rail, as well as for running rails from certain materials and/or having relatively minor sheet-metal thicknesses, it may be advantageous for a weld seam to be generated using a laser-welding system.

Depending on the embodiment, it may be advantageous for such welding not to be performed in a vertical symmetry plane of the running rail, but to be spaced apart therefrom. On account thereof, any disadvantageous mechanical superimposition of fastening and/or connecting means that are attached in the symmetry plane with the weld may be avoided, for example.

By way of an arrangement of the legs of the third profiled portion that is possible according to the invention and is perpendicular to and approximately centric on the lower legs of the first and of the second profiled portion, the structural rigidity and strength of the lower legs of the first and of the second profiled portion and thus also of the entire running rail may moreover be increased. The legs that are disposed in a mutually perpendicular manner herein may also be understood to be a T-beam in which the vertically disposed legs of the third profile efficiently strengthen and reinforce the horizontally disposed lower legs of the first and of the second profile. By way of the approximately centric arrangement of the legs of the third profiled portion on the lower legs of the first and of the second profiled portion the latter are supported and thus reinforced. Dimensional stability of the running faces may thus also be guaranteed in the case of a comparatively minor wall thickness in the region of these legs. The wall thicknesses of the running rails may thus be reduced, on account of which lighter and more cost-efficient running rails may be manufactured. This likewise contributes towards running rails according to the invention also being able to be manufactured from relatively thin sheet-metal panels by means of cold profile-forming, as has already been mentioned.

Good running properties for a carriage may be achieved when a running rail has an overall width of approximately 35 to 45 mm, in particular of approximately 40 mm, and an overall height of approximately 35 to 45 mm, in particular of approximately 40 mm. It has been demonstrated in the case of running rails having an overall height and an overall width of approximately 40 mm that particular good running properties may be achieved when a carriage attached to said running rail has running and guide rollers which have a maximum diameter of 20 mm, and the running faces adjacent thereto are mutually spaced apart by 20.5 to 21.5 mm.

A gravity-type conveyor system that is constructed having such running rails is particularly suitable for conveying cargo having a mass between approximately 50 grams and 30 kilograms. However, upon corresponding scaling, a running rail according to the invention in principle may also be used for conveying cargo having a mass that is outside this range.

The running faces of a running rail according to the invention may be specially surface treated, for example polished, during or after manufacturing of the running rail.

BRIEF DESCRIPTION OF THE DRAWINGS

The invention is to be explained in more detail hereunder by means of exemplary embodiments in conjunction with the appended drawings. In the drawings and in a schematic manner.

DETAILED DESCRIPTION OF THE INVENTION

Figure 1:
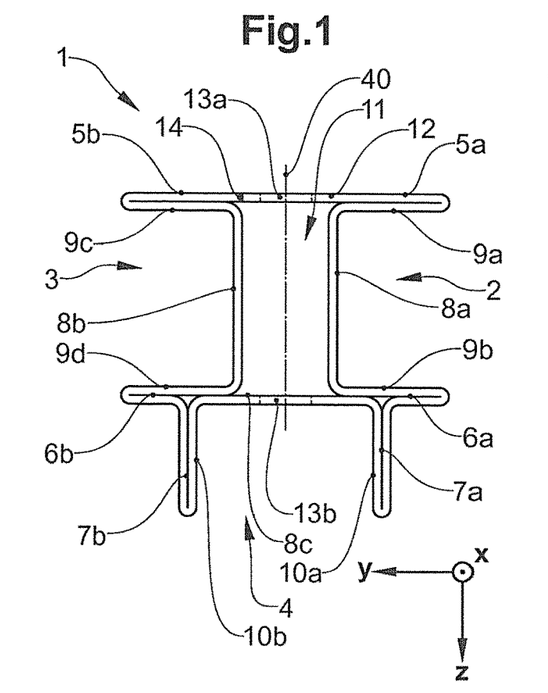
FIG. 1 shows an embodiment of a running rail in a profile view.

FIGS. 1 to 4 show embodiments of a running rail 1 such as may be used for a gravity-type suspended conveyor, for instance. As is shown in FIG. 1, the running rail 1 comprises first, second, and third profiled portions 2, 3, 4, each having a U-shape or a C-shape, respectively. These profiled portions are disposed such that upper horizontal legs 5a, b and lower horizontal legs 6a, b result in the overall profile of the running rail 1. These legs each are each connected by vertical connection portions 8a, 8b. The first and the second profiled portion 2, 3 are disposed in a mirror-symmetrical manner to the vertical central plane (symmetry plane) 40.

Two vertical legs 7a,b which are connected by a horizontal connection portion 8c are disposed on the lower side of the running rail 1. The internal sides of the horizontal legs 5a, b, 6a, b each are configured as horizontal running faces 9a-d for the support rollers of a carriage (not shown). The internal sides of the vertical legs 7a, b each are configured as vertical running faces 10a, b for the guide rollers of a carriage (not shown).

An intermediate space 11 which on the upper side thereof is closed by a mechanical connection 12 and which extends in the longitudinal direction of the rail is located between the connection portions 8a-c.

Moreover, fastening openings 13a, b which are distributed along the running direction (x-axis) are disposed in the horizontal connection portion 8c and in the mechanical connection 12 in the running rail 1 shown. Screws for suspending a running rail 1 or for connecting a plurality of running rails 1 by means of a respective connector may, for example, be attached in such fastening openings 13a,b, as will yet be shown.

The running rail 1 shown in FIG. 1 may be manufactured by a bending method from a metal band, for example. To this end, a metal band may be bent by 180° on each of the external ends of the upper horizontal legs 5a, b, of the lower horizontal legs 6a, b, and of the vertical legs 7a, b, as is schematically shown in FIG. 1. In the case of the running rail shown, the metal band has moreover been formed such that the two longitudinal edges thereof in the bent state have a predetermined spacing from the vertical symmetry plane of the running rail 1, are mutually contiguous, and are connected by way of a weld seam 14 which, on account thereof, is eccentric.

Figure 2:
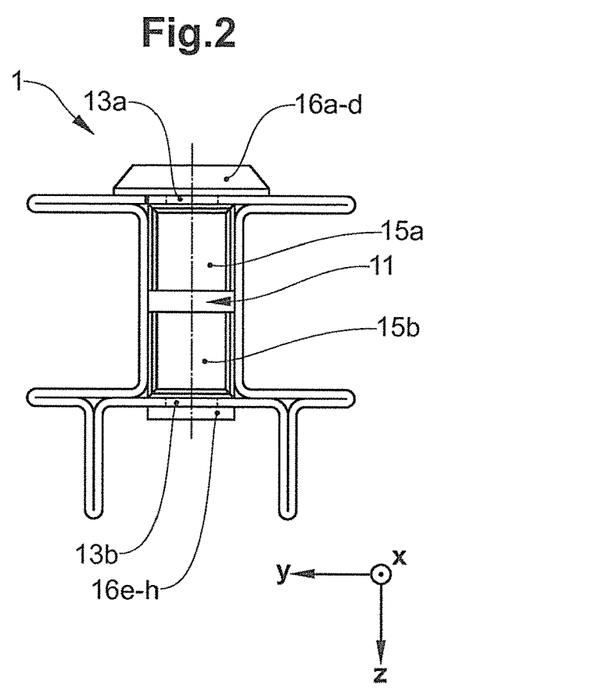
FIG. 2 shows the embodiment of FIG. 1, having means for connecting two running rails, in a profile view.
Figure 5:
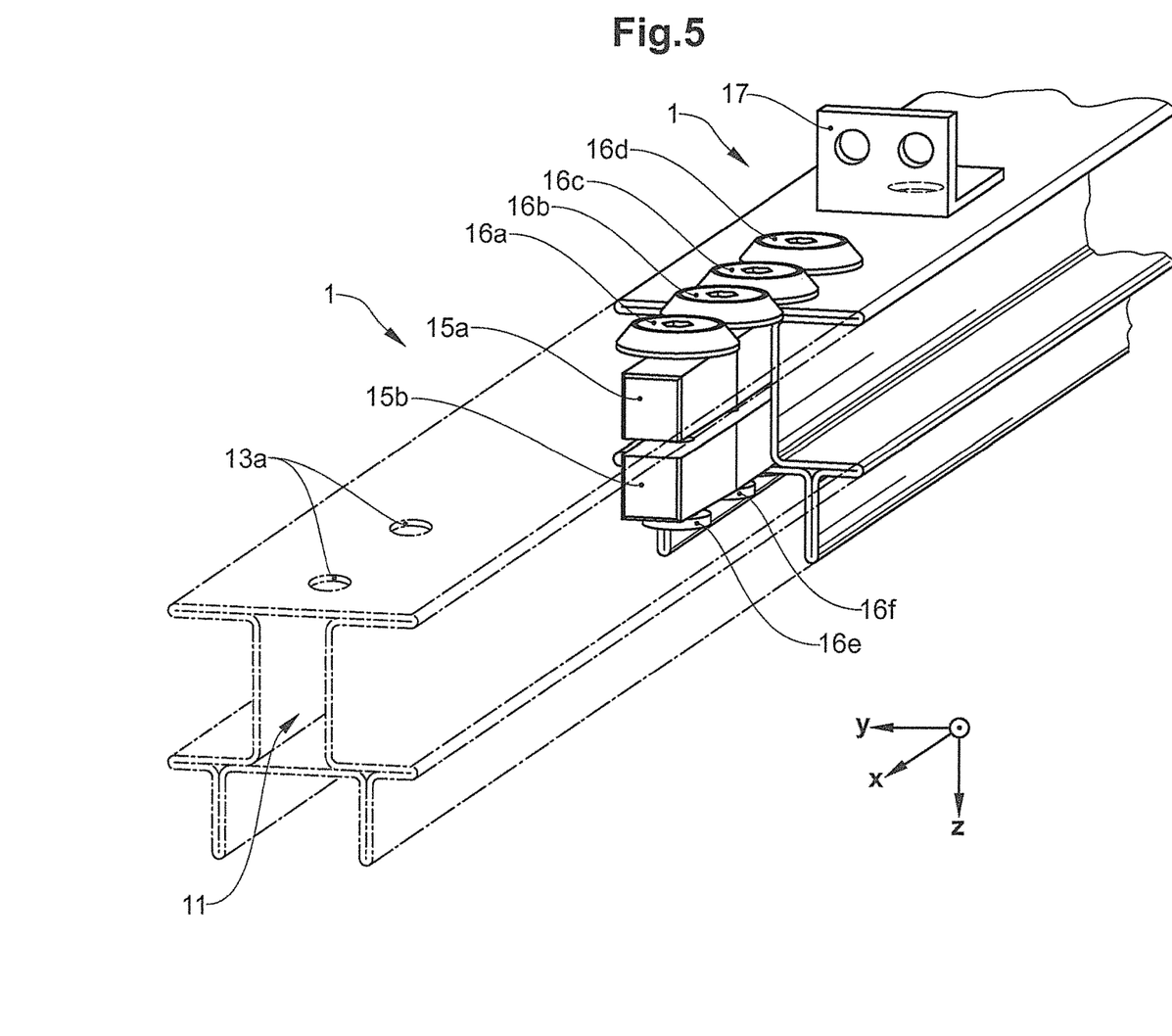
FIG. 5 shows an embodiment of a running rail having means for connecting two running rails, in a perspective view from above.

As is shown in FIG. 2 and FIG. 5, a plurality of running rails 1 may be hooked up in a mechanically fixed manner by means of upper and one lower connector 15a, b which are disposed in the intermediate space 11 of said running rails 1 in the case of the embodiment shown. To this end, a first end of a connector 15a, b is introduced into the intermediate space 11 of a first running rail 1, and a second end is introduced into the intermediate space 11 of a second running rail. The connectors 15a, b are subsequently screw-fitted to the running rails 1 by means of connection screws 16a-h that penetrate the fastening openings 13a, b.

As is shown in FIGS. 5 to 8, a running rail may dispose of suspension means or supporting means, for example in the form of an angle bracket 17. Such an angle bracket 17 may be adhesively bonded, riveted, screw-fitted, or welded to the surface of a running rail 1, for example. Alternatively or additionally, such a fishplate may also be screw-fitted into a fastening opening that is attached to the running rail.

Figure 3:
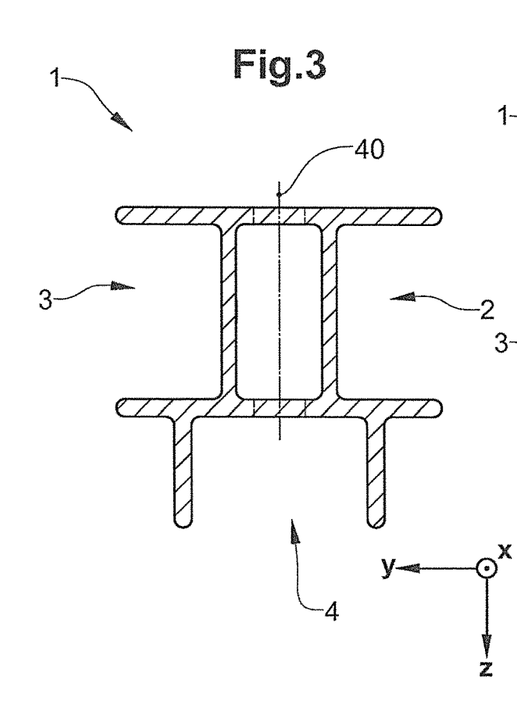
FIG. 3 shows a further embodiment of a running rail in a profile view.

FIG. 3 shows a further embodiment of a running rail 1 which has been integrally manufactured and does not have any joints. Such manufacturing may be performed by means of an extrusion method, for instance.

Figure 4:
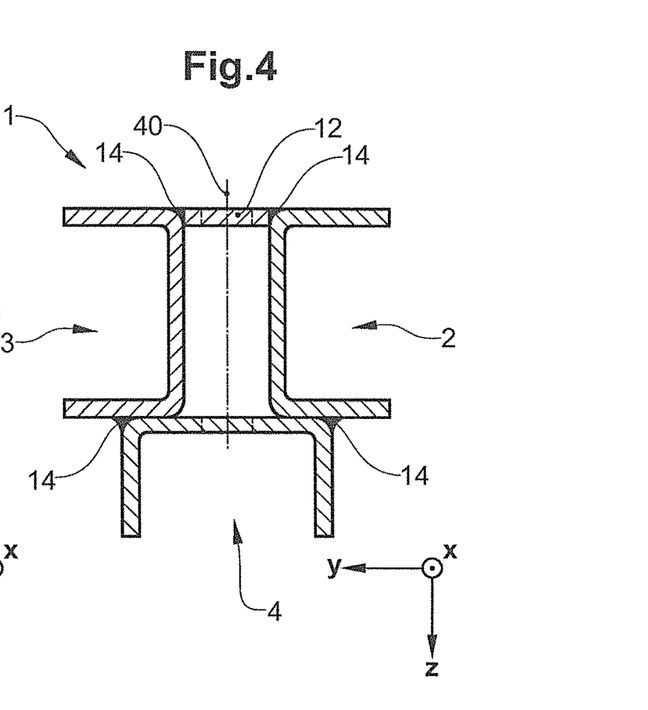
FIG. 4 shows a further embodiment of a running rail in a profile view.

As is shown in FIG. 4, a running rail 1 in one embodiment may also be constructed from a plurality of components. Herein, the running rail 1 shown is composed of three U-profiles and one mechanical connection 12, each forming one profiled portion 2, 3, 4, and being connected in a mechanical (form-fitting) manner by weld seams 14. Adhesively bonded connections, screw connections, soldered/brazed connections, or other joining methods may also be employed instead of weld seams.

Figure 6:
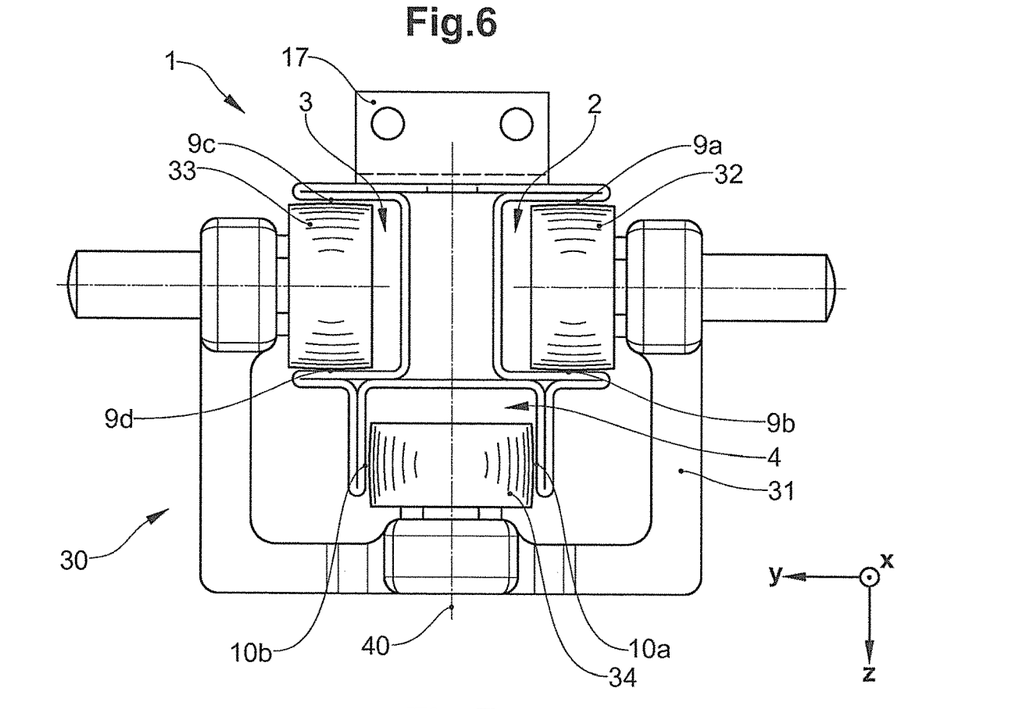
FIG. 6 shows a carriage in the running rail of FIG. 1.

It is shown in FIG. 6 how a carriage 30 acts as an external runner on a running rail 1. The carriage 30 disposes of first running rollers 32 and of second running rollers 33 that are sequentially disposed in pairs (in the x-direction), wherein only those running rollers in the foreground are visible in each case in the picture. Herein, the first support rollers 32 are disposed in the region of the first profiled portion 2, between the upper horizontal leg 5a and the lower horizontal leg 6a. In an analogous manner, the same applies to the second support rollers 33 and to the second profiled portion 3. The first and the second support rollers 32, 33 each may either be in rolling contact with a lower horizontal running face 9b, 9d on the lower side, or with an upper horizontal running face 9a, 9c on the upper side. To this end, the vertical spacing between the horizontal running faces is chosen so as to be somewhat larger than the maximum diameter of the support rollers.

The carriage 30 also comprises a pair of guide rollers 34 which are sequentially disposed (in the x-direction) and which are disposed in the region of the third profiled portion 4 between the vertical legs 7a, 7b. The guide rollers 34 each may be in rolling contact on one of the two vertical running faces 10a, 10b. There too, the (horizontal) spacing between the vertical running faces is chosen so as to be somewhat larger than the maximum diameter of the guide rollers.

By virtue of this arrangement of the running faces in relation to the rollers of a carriage, such displacements or torsional movements of the carriage 30 in relation to the running rail 1 which would lead to contact between the rollers and parts of the running rail that are not running faces are precluded. Likewise, direct contact between the carriage body 31 and the running rail 1 is prevented.

Figure 7:
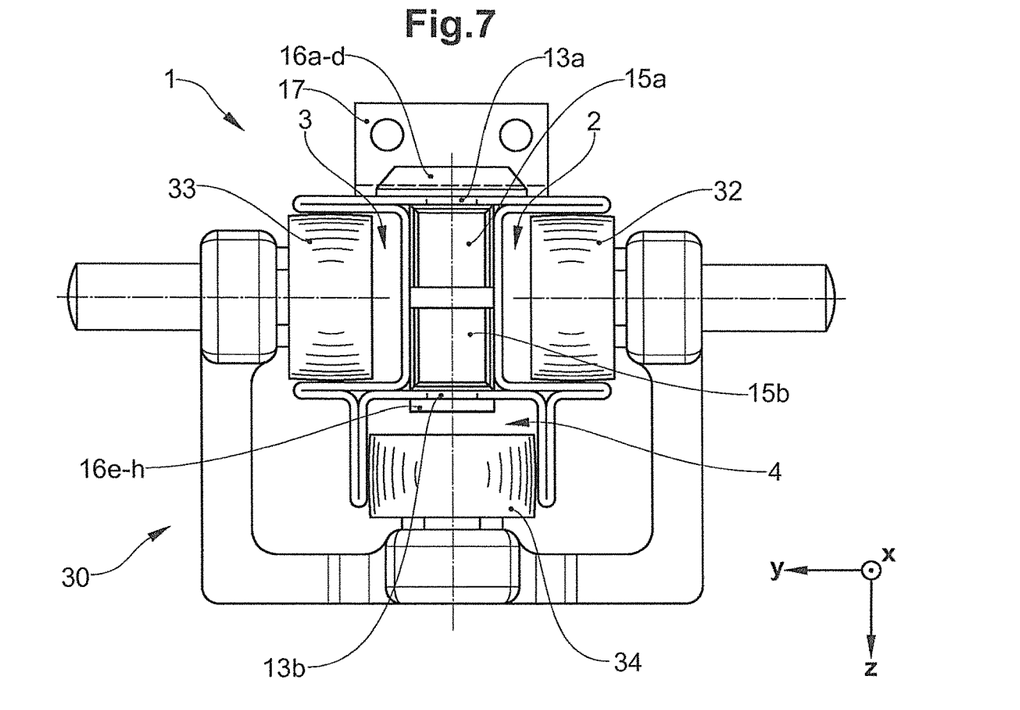
FIG. 7 shows a carriage in the running rail of FIG. 2.

FIG. 7 shows a running rail 1 having connectors 15a, b, in an analogous manner to FIGS. 2 and 5, having an inserted carriage 30. Since the connectors 15a, b are disposed in the intermediate space 11 and the connection screws 16a-h are spaced apart from the guide rollers 34, it may be ensured that the carriages 30 may run in a trouble-free manner on consecutive running rails 1. A sufficient spacing between the guide rollers and the lower connection screws 16a-h is achieved by restricting the tilting movements by way of the support rollers 32, 33.

Figure 8A:
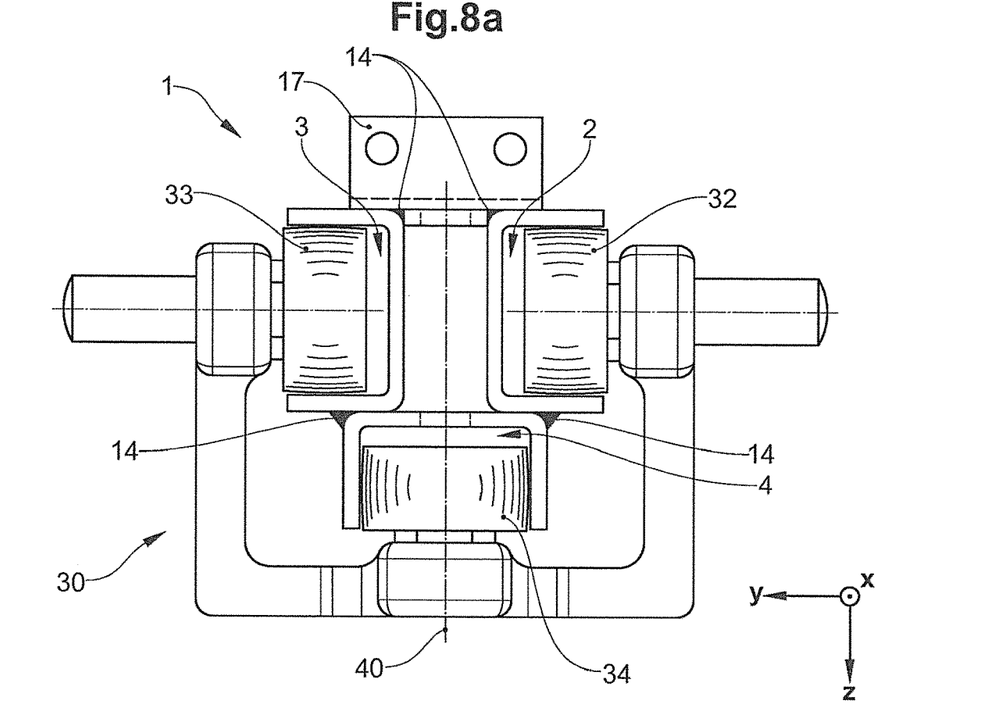
FIG. 8a shows a carriage in the running rail of FIG. 4.

FIG. 8a shows the running rail 1 of FIG. 4, having a carriage 30. The support rollers 32, 33 and guide rollers 34 of the carriage 1 are received in the first 2, the second 3, and the third profiled portion 4. The weld seams 14 for connecting the three U-profiles herein are disposed such that the former do not have any influence on the running properties of the carriage 30.

Figure 8B:
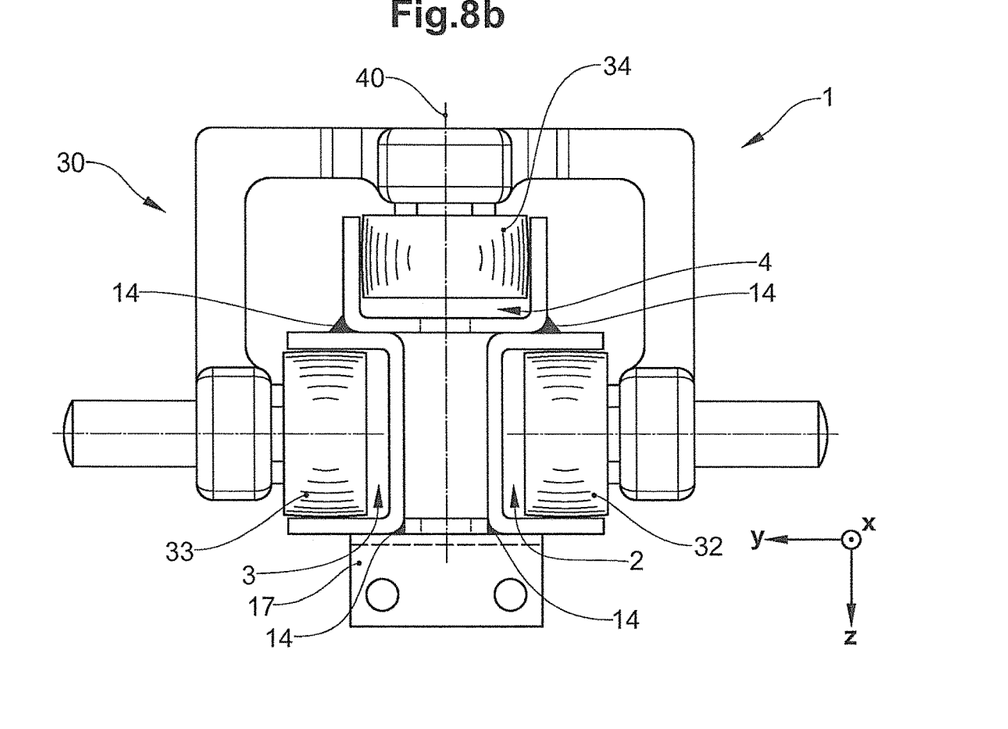
FIG. 8b shows a carriage in a running rail of FIG. 5 that is rotated by 180° about a longitudinal axis.

FIG. 8b shows the running rail 1 of FIG. 4, which is used not for suspended conveying but for supported conveying, and to this end has been rotated by 180° about the longitudinal axis thereof (in parallel with the x-axis). On account thereof, a carriage (not shown) may embrace the running rail 1 from above and may travel on the latter. The running rail 1 thus also enables conveyor systems in which a cargo supported from below, that is to say lying on a plate that is fastened to a carriage, for example, may be conveyed to be erected.

A plurality of plates, each fastened to a carriage, may also be joined so as to form a plate assembly on which cargo may be conveyed in a manner supported from below.

The invention claimed is:

1. A running rail (1) for a conveyor, having a cross-sectional profile comprising:

a. at least three interconnected profiled portions, each having a cross-sectional profile in a U-shape, comprising    b. a first profiled portion (2), unobstructively laterally open to outside, for receiving first rollers (32) of a carriage (30);

c. a second profiled portion (3), unobstructively laterally open to outside, for receiving second rollers (33) of a carriage (30), wherein the first (2) and the second profiled portion (3) are disposed in a mirror-symmetrical manner to a vertical central plane (40) of the running rail (1); and    d. a third profiled portion (4), unobstructively open in a vertical direction, for receiving third rollers (34) of a carriage (30), wherein the running rail (1) is manufactured by bending a metal band or a metal strip.

2. The running rail according to claim 1, wherein the third profiled portion (4) is configured and disposed so as to be mirror-symmetrical to the vertical central plane (40) of the running rail (1).

3. The running rail according to claim 1, wherein the first (2), the second (3), and the third profiled portion (4) each have a cross-sectional profile in a U-shape, comprising a connection portion (8a-c) and legs (5a,b; 6a,b; 7a,b) contiguous thereto on both sides.

4. The running rail according to claim 3, wherein the connection portion (8a) of the first profiled portion (2) and the connection portion (8b) of the second profiled portion (3) are disposed perpendicularly on the connection portion (8c) of the third profiled portion (4) and abut the third profiled portion (4).

5. The running rail according to claim 1, wherein the first (2) and the second profiled portion (3) are mutually spaced apart and form an intermediate space (11) which extends along the running rail (1).

6. The running rail according to claim 5, wherein the intermediate space (11), extending along the running rail (1), at a top or bottom is closed by a mechanical connection (12) between the first (2) and the second profiled portion (3).

7. The running rail according to claim 1, further comprising means (13a, 17) for fastening the rail to a support construction, or a ceiling provided on the running rail (1).

8. The running rail according to claim 7, wherein the means for fastening the rail comprise angle brackets (17) which are attached to an upper side or a lower side of the running rail (1).

9. The running rail according to claim 7, wherein the means for fastening the rail comprise openings (13a,b) which penetrate the running rail (1).

10. The running rail according to claim 1, wherein the running rail (1) is integrally configured.

11. The running rail according to claim 10, wherein the running rail (1) is manufactured by an extrusion method.

12. The running rail according to claim 1, wherein the running rail (1) is configured in multiple parts.

13. The running rail according to claim 12, wherein the first (2), the second (3), and the third profiled portion (4) each comprise one U-rail, the U-rail interconnected in a mechanically fixed, materially integral manner.

14. The running rail according to claim 1, wherein the running rail (1) is made from a stainless steel or aluminium.

15. The running rail according to claim 1, further comprising means (13a,b) for connecting the running rail to further running rails, so as to form a continuous running rail track, disposed in the region of the ends of the running rail (1).

16. The running rail according to claim 15, wherein the means for connecting comprise bores (13a,b) which are provided in the region of the ends of the running rails (1) and which serve for fastening connector parts (15a, b) inserted into the ends of rails to be connected.

17. A method for manufacturing a running rail according to claim 1, said method comprising the following steps:
   a. providing a metal band or a metal strip comprising a first and a second longitudinal edge, the second longitudinal edge parallel with the first longitudinal edge;
   b. bending the metal band or the metal strip to the shape of a profile such that the first and the second longitudinal edge of the metal band or of the metal strip mutually abut; and
   c. closing the profiled body by welding the first to the second longitudinal edge of the metal band or of the metal strip.

18. The method according to claim 17, wherein the first and the second longitudinal edge of the metal band or of the metal strip in the case of the finished bent running rail (1) mutually abut on the upper side or the lower side (12) of the finished bent running rail (1).

19. The method according to claim 18, wherein the first and the second longitudinal edge of the metal band or of the metal strip in the case of the finished bent running rail (1) mutually abut outside the vertical symmetry plane (40) of the running rail (1), having a predetermined spacing from the vertical symmetry plane (40).

* * * * *